United States Patent [19]

Springer et al.

[11] Patent Number: 5,093,483

[45] Date of Patent: Mar. 3, 1992

[54] WATER-SOLUBLE AZO COMPOUNDS HAVING A 6-CARBOXY-2-NAPHTHAL AS COUPLING COMPONENTS, SUITABLE AS DYESTUFFS

[75] Inventors: Hartmut Springer, Königstein/Taunus; Kurt Hussong, Kelkheim(Taunus), both of Fed. Rep. of Germany

[73] Assignee: Hoechst Aktiengesellschaft, Frankfurt am Main, Fed. Rep. of Germany

[21] Appl. No.: 528,024

[22] Filed: Jun. 26, 1990

Related U.S. Application Data

[63] Continuation of Ser. No. 198,934, May 25, 1988, abandoned.

[30] Foreign Application Priority Data

May 29, 1987 [DE] Fed. Rep. of Germany ....... 3718180

[51] Int. Cl.⁵ .................... C09B 62/51; D06P 1/384
[52] U.S. Cl. .................................. 534/642; 534/640
[58] Field of Search ................ 534/630, 640, 642, 644

[56]   References Cited
       U.S. PATENT DOCUMENTS 2,657,205  10/1953  Heyna et al. ..................... 534/642

FOREIGN PATENT DOCUMENTS 172789  2/1986  European Pat. Off. ............. 534/642
965902  6/1957  Fed. Rep. of Germany ...... 534/642
641816  4/1928  France .

Primary Examiner—Mary C. Lee
Assistant Examiner—Fiona T. Powers

[57]   ABSTRACT

Water-soluble monoazo compounds having fiber-reactive dyestuff properties which correspond to the general formula

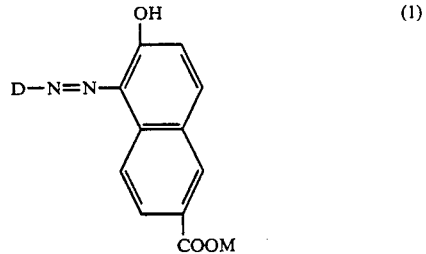

in which
M is a hydrogen atom or an alkali metal,
D is a group of the general formula (2a), (2b) or (2c)

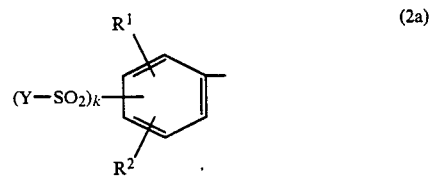

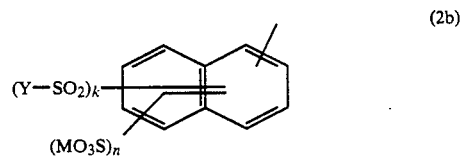

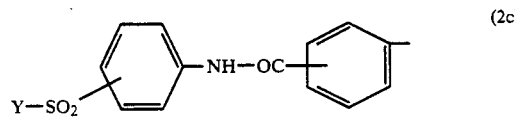

in which
R¹ denotes hydrogen, cyano, lower alkyl which is optionally substituted by sulfo, carboxy or sulfato, hydroxy, alkoxy which is optionally subhstituted by sulfo, carboxy, or sulfato, sulfo, carboxy, halogen or denotes a group of the formula (3)

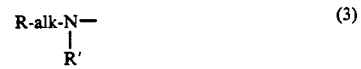

in which
alk is an alkylene having 2 to 4 carbon atoms,
R is sulfo, carboxy, sulfato or phosphato and
R¹ is hydrogen, methyl or ethyl,
R² denotes hydrogen, lower alkoxy, lower alkyl or sulfo,
Y is the vinyl group or stands for an ethyl group which contains a subhstituent in the β-position which can be eliminated by alkali,
k is the number 1 or 2 and
n denotes the number zero or 1.

10 Claims, No Drawings

WATER-SOLUBLE AZO COMPOUNDS HAVING A 6-CARBOXY-2-NAPHTHAL AS COUPLING COMPONENTS, SUITABLE AS DYESTUFFS

This application is a continuation of copending application Ser. No. 07/198,934, filed on May 25, 1988, now abandoned.

The technical field of the invention is that of fiber-reactive dyestuffs.

Example 4 of U.S. Pat. No. 2,657,205 and Example 43 of German Patent No. 965,902 disclose fiber-reactive azo dyestuffs which contain a vinyl sulfonyl or β-sulfatoethylsulfonyl group in the diazo component and the 2-naphthol-6-sulfonic acid or 2-naphthol-3-carboxylic acid as the coupling component.

The present invention now provides novel water-soluble monoazo compounds which have improved properties and correspond to the general formula (1)

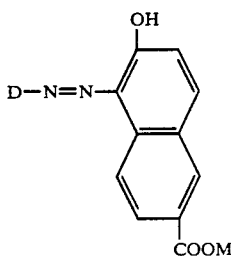

in which the symbols have the following meanings:
M is a hydrogen atom or an alkali metal such as sodium, potassium or lithium;
D is a group of the general formula (2a), (2b) or (2c)

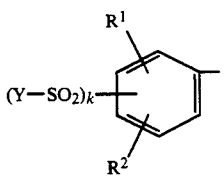

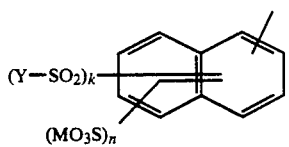

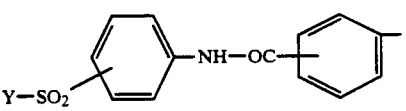

in which
$R^1$ is a hydrogen atom, the cyano group or an alkyl group having 1 to 4 carbon atoms which can be substituted by a sulfo, carboxy or sulfato group, or is a hydroxy group, an alkoxy group having 1 to 4 carbon atoms which can be substituted by a sulfo, carboxy or sulfato group, a sulfo group, a carboxy group, a halogen atom such as a bromine or chlorine atom or a group of the general formula (3)

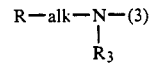

in which
alk is an alkylene group having 2 to 4 carbon atoms preferably an ethylene group,
R stands for the sulfo, carboxy, sulfato or phosphato group and
$R^3$ is a hydrogen atom or is the methyl or ethyl group,
$R^2$ is a hydrogen atom or an alkoxy group having 1 to 4 carbon atoms or is an alkyl group having 1 to 4 carbon atoms or is a sulfo group,
Y stands for vinyl group or for an ethyl group which, in the β-position, contains a substituent which can be eliminated by alkali with the formation of the vinyl group,
k denotes the number 1 or 2, preferably 1,
n stands for the number zero or 1 (in the case of n=zero this group denoting a hydrogen atom) and
M has one of the abovementioned meansings.

Of the alkoxy groups, the ethoxy group and in particular the methoxy group are preferred. Of the alkyl groups, the ethyl group and in particular the methyl group are preferred. Preferably, M is a hydrogen atom and, in particular, an alkali metal.

Of the alkoxy and alkylamino groups mentioned for $R^1$ and substituted by a water-solubilizing group, preferred examples are the β-sulfatoethylamino, the N-methyl-N-(β-sulfatoethyl)-amino and the β-sulfatoethoxy group. Preferably, $R^2$ is a hydrogen atom and, preferably, $R^1$ is a hydrogen atom or a methoxy group. Preferably, the group Y—SO₂— in the formula radical (2a) is in the meta- or para-position with respect to the free bond leading to the azo group. Preferably, the group in the formula radical (2b) is in the 6- or 8-position if the free bond to the azo group is in the 2-position; in the group of the formula (2b), the azo group is preferably in the 2-position.

Emphasis can be given in particular to those compounds according to the invention in which D stands for the 4-(β-sulfatoethylsulfonyl)phenyl, the 4-(β-thiosulfatoethylsulfonyl)phenyl, the 2-sulfo-5-(β-sulfatoethylsulfonyl)phenyl, the 8-(β-sulfatoethylsulfonyl)-6-sulfonaphth-2-yl or the 6-(β-sulfatoethylsulfonyl)-8-sulfonaphth-2-yl radical.

Substituents which, as per the definition of symbol Y, are bonded in the β-position of the ethyl group and can be eliminated by alkali with the formation of a vinyl group, are, for example, alkanoyloxy groups having 2 to 5 carbon atoms such as the acetyloxy group, aroyloxy groups such as the benzoyloxy, sulfobenzoyloxy or carboxybenzoyloxy group, dialkylamino groups having alkyl radicals of 1 to 4 carbon atoms such as, in particular, the dimethylamino and diethylamino group, trialkylammonium groups having alkyl radicals of 1 to 4 carbon atoms such as the trimethylammonium group, the chlorine atom, the bromine atom, alkylsulfonyloxy groups having alkyl radicals of 1 to 4 carbon atoms, a phosphato group, a thiosulfato group or a sulfato group. Preferably, Y stands for the vinyl group and the β-phosphatoethyl group, particularly preferably for the β-thiosulfatoethyl group and very particularly preferably for the β-sulfatoethyl group.

Sulfo groups are groups according to the general formula —SO₃M, carboxy groups are groups according to the general formula —COOM, sulfato groups are groups according to the general formula —OSO₃M, thiosulfato groups are groups according to the general formula —S—SO₃M and phosphato groups are groups according to the general formuls —OPO₃M₂, M having the abovementioned meaning.

The present invention further relates to processes for preparing compounds of the general formula (1). These processes comprise coupling the diazonium compound of an aromatic amine of the general formula (4a), (4b) or (4c)

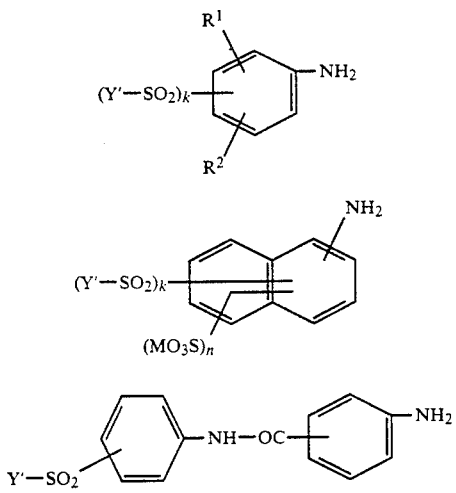

in which R¹, R², M, k and n have the abovementioned meanings and Y' has one of the meanings mentioned for Y or is the β-hydroxyethyl group, with 2-hydroxynaphthalene-6-carboxylic acid or a salt of this carboxylic acid and, in the case where Y' denotes a β-hydroxyethyl group, converting the azo compound formed having this hydroxyethylsulfonyl group by means of a conventional acylation or esterification agent to an azo compound of the general formula (1) in which Y is an ethyl group which contains an inorganic or organic ester radical in the β-position.

Inorganic or organic ester radicals are in particular the sulfato, phosphato, alkanoyloxy, benzoyloxy, alkylsulfonyloxy, phenylsulfonyloxy or toluylsulfonyloxy radicals already mentioned above.

Thus, azo compounds according to the invention in which Y is a β-sulfatoethyl or β-phosphatoethyl group can be prepared in a manner according to the invention by reacting an azo compound which corresponds to the general formula (1) but in which Y stands for the β-hydroxyethyl group with a sulfating or phosphatizing agent analogously to known procedures.

Sulfating agents are known; they are, for example, concentrated sulfuric acid and sulfuric acid monohydrate. Preferably, the sulfating is carried out by means of concentrated sulfuric acid at a temperature between 0° and 40° C. or by means of sulfuric acid monohydrate at a temperature between 5° and 15° C.

Phosphatizing agents are likewise known; they are phosphoric acid, polyphosphoric acid, phosphorus oxychloride or mixtures of these acids with phosphorus pentoxide. The phosphatizing reaction using these agents is generally carried out between 20° and 80° C.

Azo compounds according to the invention in which Y is an alkanoyloxy group can be prepared in the same manner by reacting the corresponding azo starting compound which contains the β-hydroxyethylsulfonyl radical with an acylating agent of an alkanecarboxylic acid or of an aromatic carboxylic acid such as, for example, acetyl chlorid, glacial acetic acid, acetic anhydride and benzoyl chloride.

The preparation according to the invention of those compounds of the general formula (1) in which Y stands for the β-thiosulfatoethyl group is of particular interest. In addition to the abovementioned procedure of reacting the diazo components according to the formulae (4) with the 2-naphthol-6-carboxylic acid, these compounds are also obtained in such a way that a compound according to the general formula (1) in which Y stands for the β-sulfatoethyl group is first converted in a strongly alkaline range such as at a pH between 10 and 13 and at a temperature between 35° and 50° C. to the vinylsulfonyl compound according to the invention, the solution is then adjusted to a pH between 4 and 6, and the vinylsulfonyl compound is reacted with sodium thiosulfate to form the β-thiosulfatoethylsulfonyl compound.

The compounds of the general formulae (4) are known and have been described in the literature in large numbers. Likewise, the 2-naphthol-6-carboxylic acid is known as an intermediate (see for example European Patent No. 0,053,824B1).

Diazo components according to the general formulae (4) are, for example, 4-(β-sulfatoethylsulfonyl)aniline, 2-sulfo-4-(β-sulfatoethylsulfonyl)aniline, 3-(β-sulfatoethylsulfonyl)aniline, 2,4-disulfo-5-(β-sulfatoethylsulfonyl)aniline, 2-sulfo-5-(β-sulfatoethylsulfonyl)aniline, 2-hydroxy-5-(β-sulfatoethylsulfonyl)aniline, 2-hydroxy-4-(β-sulfatoethylsulfonyl)aniline, 4-methoxy-3-(β-sulfatoethylsulfonyl)aniline, 3-methoxy-4-(β-sulfatoethyl-sulfonyl)aniline, 2-methoxy-5-(β-sulfatoethylsulfonyl)-aniline, 2-methoxy-4-(β-sulfatoethylsulfonyl)aniline, 4-methyl-3-(β-sulfatoethylsulfonyl)aniline, 2-(β-sulfatoethylsulfonyl)aniline, 2-chloro-5-(β-sulfatoethylsulfonyl)aniline, 4-chloro-3-(β-sulfatoethylsulfonyl)aniline, 5methyl-2-methoxy-4-(β-sulfatoethylsulfonyl)aniline, 2,5-dimethoxy-4-(β-sulfatoethylsulfonyl)aniline, 2-carboxy-5-(β-sulfatoethylsulfonyl)aniline, 4-amino-3'-(β-sulfato-ethylsulfonyl)-benzanilide, 4-(β-sulfatoethylamino)-3-(β-sulfatoethylsulfonyl)aniline, 4-[N-methyl,N-(β-sulfatoethyl)]-amino-3-(β-sulfatoethylsulfonyl)aniline, 4-(β-sulfatoethoxy)-3-(β-sulfatoethylsulfonyl)aniline, 6-(β-sulfatoethylsulfonyl)-2-aminonaphthalene, 8-sulfo-6-(β-sulfatoethylsulfonyl)-2-aminonaphthalene, 1-sulfo-6-(β-sulfatoethylsulfonyl)-2-aminonaphthalene, 6-sulfo-8-(β-sulfatoethylsulfonyl)-2-aminonaphthalene, 8-(β-sulfatoethylsulfonyl)-2-aminonaphthalene, 7-(β-sulfatoethylsulfonyl)-2-aminonaphthalene, 5-(β-sulfatoethylsulfonyl)-2-aminoapthalene, 7-sulfo-5-(β-sulfatoethylsulfonyl)-2-aminonaphthalene, 5-sulfo-7-(β-sulfatoethylsulfonyl)-2-aminonaphthalene, 2,5-bis-(β-sulfatoethyl sulfonyl)aniline and 3,4-bis(β-sulfatoethylsulfonyl)-aniline and also, for example, β-thiosulfatoethylsulfonyl and β-phosphatoethylsulfonyl derivatives thereof.

The diazotization reaction of the starting compounds according to the general formulae (4) is generally carried out analogously to known procedures by the action of nitrous acid in aqueous mineral acid solution at temperatures below 15° C. such as a temperature between −5° C. and +10° C. The coupling of the diazonium salt with 2-naphthol-6-carboxylic acid or its salt is carried out in a weakly acidic to neutral range, preferably in a weakly acidic range, analogously to the known coupling reactions. If the starting compounds of the general formulae (4) already contain a highly reactive group —SO$_2$—Y such as the β-sulfatoethylsulfonyl group, the coupling is preferably carried out at a pH between 4 and 6.0 to prevent damage to the fiber-reactive group. However, if diazo components are used in which Y' stands for the β-hydroxyethyl group, the coupling can also be carried out in a more strongly alkaline range such as at a pH of up to 9. The coupling temperature is generally between 10° and 40° C.

Precipitation and isolation of the compounds of the general formula (1) prepared according to the invention from the synthesis solutions can take place by generally known methods, thus, for example, either by precipitating them from the reaction medium by means of electrolytes such as, for example, sodium chloride or potassium chloride, or by evaporation of the reaction solution, for example spray-drying, in which case a buffer substance can be added to this reaction solution.

The compounds of the general formula (1) according to the invention have fiber-reactive properties and have very good dyestuff properties. Therefore, they can be used for dyeing (including printing) hydroxy-containing and/or carboxamido-containing material. The solutions formed in the synthesis of the compounds according to the invention can also be used, with or without addition of a buffer substance, with or without concentrating, directly as a liquid formulation for dyeing purposes.

The present invention therefore also relates to the use of the compounds of the general formula (1) according to the invention for dyeing (including printing) hydroxy- and/or carboxamido-containing materials and processes for applying them to these substrates. Preferably, the materials are used in the form of fiber materials, in particular in the form of textile fibers such as yarns, wound packages and fabrics. This can be done analogously to known procedures.

Hydroxy-containing materials are those of natural or synthetic origin such as, for example, cellulose fiber materials or regenerated products thereof and polyvinyl alcohols. Cellulose fiber materials are preferably cotton, but also other plant fibers such as linen, hemp, jute and ramie fibers; examples of regenerated cellulose fibers are stable viscose and filament viscose.

Carboxamido-containing materials are, for example, synthetic and natural polyamides and polyurethanes, in particular in the form of fibers, for example wool and other animal hair, silk, leather, nylon-6,6, nylon-6, nylon-11 and nylon-4.

The compounds of the formula (1) according to the invention can be applied, in accordance with the application according to the invention, to the substrates mentioned, in particular to the fiber materials mentioned, using the application techniques known for water-soluble dyestuffs, in particular fiber-reactive dyestuffs, and fixed in such a way that, for example, the monoazo compound of the general formula (1) is applied to the substrate in dissolved form or incorporated therein and fixed on or in this substrate, if necessary, by the action of heat and/or, if necessary, by the action of an alkaline-acting agent. A large number of such dyeing and fixation methods are described not only in the technical literature but also in the patent literature such as, for example, in European Published Patent Application No. 0,181,585A.

The azo compounds according to the invention give, both on carboxamido-containing materials such as, in particular, on wool, and also on hydroxy-containing material such as, in particular, cellulose fiber material, yellowish to bluish red dyeings and prints having a high color yield and good build-up, the brilliance being preserved even in deep shades. The dyeings and prints have good fastness properties such as good light and wet fastness properties and good pleating, hot press and crock fastness.

The light, washing and wet light fastness properties of the dyeings and prints on carboxamido-containing material such as, in particular, on wool can be emphasized, even if an ammoniacal aftertreatment of the dyed material which is customary in other cases is omitted. They show good compatibility with other fiber-reactive wool dyestuffs, which makes possible a level dyeing on the fiber. Likewise, it is possible to obtain level dyeings on material made of wool fibers of different proveniences using the azo compounds according to the invention, it being possible to add, if necessary, a conventional levelling auxiliary such as, for example, N-methyltaurine to improve the leveling property.

Preferably, the azo dyestuffs according to the invention are used for dyeing cellulose fiber materials. Of the good fastness properties which can be obtained on these materials, in particular the good washing fastness properties at 60° to 95° C., even in the presence of perborates, the acid and alkaline milling, cross-dyeing and perspiration fastness properties, the high resistance to steam, the good alkali, acid, water and seawater fastness properties and the good acid fading resistance upon storage of moist, acid-containing, dyed material (see German Auslegeschrift 2,322,236, column 4, lines 35 to 42) should be emphasized.

The following Examples serve to illustrate the invention. Part and percentages are by weight unless noted otherwise. Parts by weight relate to parts by volume as the kilogram relates to the liter.

The compounds described in these Examples by way of a formula are given in the form of the free acids; in general, they are prepared and isolated in the form of their sodium or potassium salts and are used in the form of their salts for dyeing. Likewise, the starting compounds and components mentioned in the following Examples, in particular the Table Examples, in the form of the free acid can be used for the synthesis as such or in the form of their salts, preferably alkali metal salts such as sodium or potassium salts. The absorption maxima given for the visible range (λ$_{max}$ values) were determined using the aqueous solution of the alkali metal salts.

EXAMPLE 1

28.1 parts of 4(β-sulfatoethylsulfonyl)aniline are diazotized at 0° to 5° C. in a solution composed of 200 parts of water and 30 parts of concentrated aqueous hydrochloric acid in the usual manner with 21 parts of an aqueous 5N sodium nitrite solution; excess nitrite is subsequently destroyed with amidosulfonic acid and the pH of the diazonium salt solution is brought to a value of 4 with sodium bicarbonate. Over a period of 15 minutes, a solution of 18.8 parts of 2-naphthol-6-carboxylic acid in 200 parts of water and 9 parts of a 33% strength aqueous sodium hydroxide solution are then added at 0° to 10° C., while maintaining a pH of 6. The mixture is stirred for another 3 hours and then adjusted to a pH of 5 with aqueous 2N sulfuric acid. By adding 25% of sodium chloride, based on the volume of the mixture, the compound according to the invention is salted out and isolated in the usual manner.

This gives an orange, electrolyte-containing (such as sodium chloride containing) powder of the sodium salt of the compound of the formula

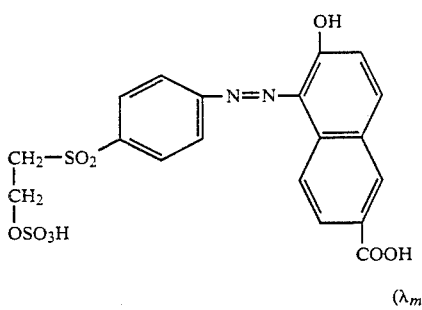

($\lambda_{max}$ = 479 nm).

This compound according to the invention has very good dyestuff properties and gives strong dyeings and prints on the materials mentioned in the description such as, in particular, cellulose fiber materials. In particular, if application and fixation methods which are customary for fiber-reactive dyestuffs are used, strong, brilliant orange dyeings having a high degree of fixation and good fastness properties are obtained, of which especially the light, wet light and washing fastness properties can be emphasized.

EXAMPLES 2 TO 33

In the following Table Examples, further monoazo compounds according to the invention and according to the general formula (1) are described by means of the radical D— of the variable diazo component. They can be prepared in a manner according to the invention, for example according to the above Working Example, by diazotization of the aromatic amine D—NH$_2$ which can be seen from the appropriate Table Example, and coupling it with 2-naphthol carboxylic acid as the coupling component. They have fiber-reactive dye-stuff properties and give, on the materials mentioned in the description such as, in particular, cellulose fiber materials using the application and fixation methods which are customary for fiber-reactive dyestuffs, strong, color-fast dyeings and prints in the shades mentioned in the appropriate Table Example for dyeings on cotton.

| Example | Radical D— | Shade |
|---|---|---|
| 2 | 2-sulfo-4-($\beta$-sulfatoethylsulfonyl)-phenyl | orange (477) |
| 3 | 2,4-disulfo-5-($\beta$-sulfatoethylsulfonyl)phenyl | orange (475) |
| 4 | 2-sulfo-5-($\beta$-sulfatoethylsulfonyl)-phenyl | orange (473) |
| 5 | 2-hydroxy-5-($\beta$-sulfatoethylsulfonyl)phenyl | reddish orange (492) |
| 6 | 3-($\beta$-sulfatoethylsulfonyl)-phenyl | orange |
| 7 | 2-hydroxy-4-($\beta$-sulfatoethylsulfonyl)-phenyl | red-orange (495) |
| 8 | 4-methoxy-3-($\beta$-sulfatoethylsulfonyl)phenyl | red |
| 9 | 3-methoxy-4-($\beta$-sulfatoethylsulfonyl)-phenyl | red |
| 10 | 2-methoxy-5-($\beta$-sulfatoethylsulfonyl)-phenyl | red |
| 11 | 2-methoxy-4-($\beta$-sulfatoethylsulfonyl)-phenyl | red |
| 12 | 4-methyl-3-($\beta$-sulfatoethylsulfonyl)-phenyl | orange |
| 13 | 2-($\beta$-sulfatoethylsulfonyl)-phenyl | orange |
| 14 | 2-chloro-5-($\beta$-sulfatoethylsulfonyl)-phenyl | orange |
| 15 | 4-chloro-3-($\beta$-sulfatoethylsulfonyl)-phenyl | orange |
| 16 | 5-methyl-2-methoxy-4-($\beta$-sulfatoethylsulfonyl)-phenyl | red |
| 17 | 2,5-dimethoxy-4-($\beta$-sulfatoethylsulfonyl)-phenyl | red |
| 18 | 2-carboxy-5-($\beta$-sulfatoethylsulfonyl)-phenyl | red |
| 19 | 4-[3'-($\beta$-sulfatoethylsulfonyl)-phenyl]-amidocarbonyl-phenyl | orange |
| 20 | 4-($\beta$-sulfatoethyl)-amino-3-($\beta$-sulfatoethylsulfonyl)-phenyl | orange |
| 21 | 4-[(N-methyl-N-($\beta$-sulfatoethyl)]-amino-3-($\beta$-sulfatoethylsulfonyl)-phenyl | orange |
| 22 | 4-($\beta$-sulfato-ethoxy)-3-($\beta$-sulfatoethylsulfonyl)-phenyl | orange |
| 23 | 6-($\beta$-sulfatoethylsulfonyl)-naphth-2-yl | red (488) |
| 24 | 8-sulfo-6-($\beta$-sulfatoethylsulfonyl)-naphth-2-yl | red (491) |
| 25 | 1-sulfo-6-($\beta$-sulfatoethylsulfonyl)-naphth-2-yl | red (484) |
| 26 | 6-sulfo-8-($\beta$-sulfatoethylsulfonyl)-naphth-2-yl | red (495) |
| 27 | 8-($\beta$-sulfatoethylsulfonyl)-naphth-2-yl | red (490) |
| 28 | 7-($\beta$-sulfatoethylsulfonyl)-naphth-2-yl | orange-red |
| 29 | 5-($\beta$-sulfatoethylsulfonyl)-naphth-2-yl | orange-red |
| 30 | 7-sulfo-5-($\beta$-sulfatoethylsulfonyl)-naphth-2-yl | orange-red |
| 31 | 5-sulfo-7-($\beta$-sulfatoethylsulfonyl)-naphth-2-yl | orange-red |
| 32 | 2,5-bis-($\beta$-sulfatoethylsulfonyl)-phenyl | orange |
| 33 | 3,4-bis-($\beta$-sulfatoethylsulfonyl)-phenyl | orange |

We claim:
1. A compound which corresponds to the formula

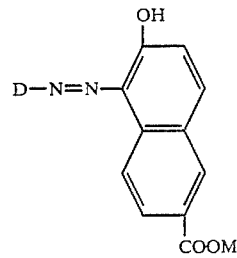

in which
M is hydrogen or an alkali metal;
D is of the formula

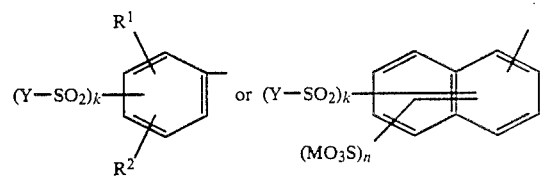

in which
R$^1$ is hydrogen, or alkyl having 1 to 4 carbons, or alkoxy having 1 to 4 carbons,
R$^2$ is hydrogen or alkoxy having 1 to 4 carbons or is alkyl having 1 to 4 carbons
Y stands for vinyl or $\beta$-sulfatoethyl or $\beta$-thiosulfatoethyl group, k denotes the number 1,
n stands for the number zero or 1 (in the case of n=zero this group denoting hydrogen), and
M has one of the abovementioned meanings.

2. The compound as claimed in claim 1, wherein Y is β-sulfatoethyl.

3. The compound as claimed in claim 1, wherein D is 4-(β-sulfatoethylsulfonyl)phenyl.

4. The compound as claimed in claim 1, wherein D is 2-sulfo-4-(β-sulfatoethylsulfonyl)phenyl.

5. The compound as claimed in claim 1, wherein D is 2-sulfo-5-(β-sulfatoethylsulfonyl)phenyl.

6. A compound according to claim 1, in which n is 1.

7. A compound which corresponds to the formula

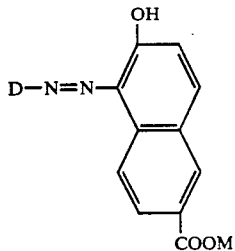

in which
M is hydrogen or an alkali metal;
D is of the formula

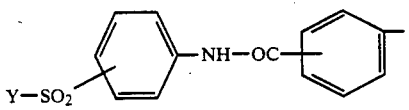

or

![structure]

in which
$R^1$ and $R^2$ both denote a hydrogen,
Y stand for vinyl or for ethyl which, in the β-position, contains a substituent which is eliminated by alkali with the formation of the vinyl,
k denotes the number 1 or 2,
n stands for the number zero or 1 (in the case of n=zero this group denoting hydrogen), and
M has one of the abovementioned meanings.

8. A compound according to claim 7, in which k is 1.

9. The compound as claimed in claim 7, wherein Y is vinyl or β-sulfatoethyl or β-thiosulfatoethyl.

10. The compound as claimed in claim 7, wherein Y is β-sulfatoethyl.

* * * * *